J. HADKA.
AUTOMOBILE FENDER.
APPLICATION FILED DEC. 5, 1910.
1,026,981.
Patented May 21, 1912.
2 SHEETS—SHEET 1.
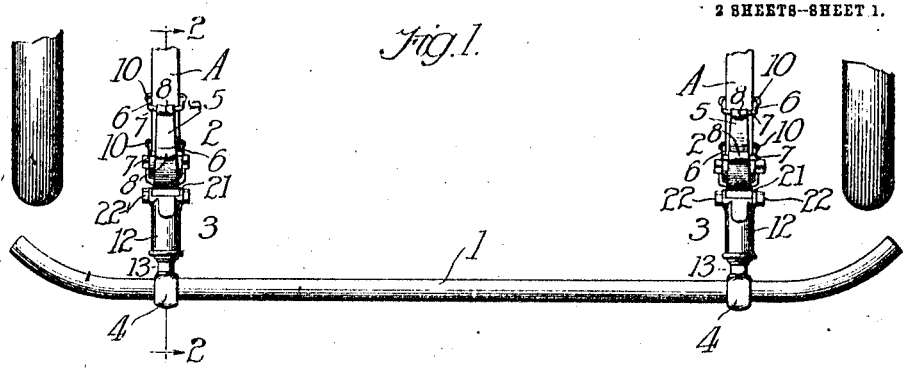
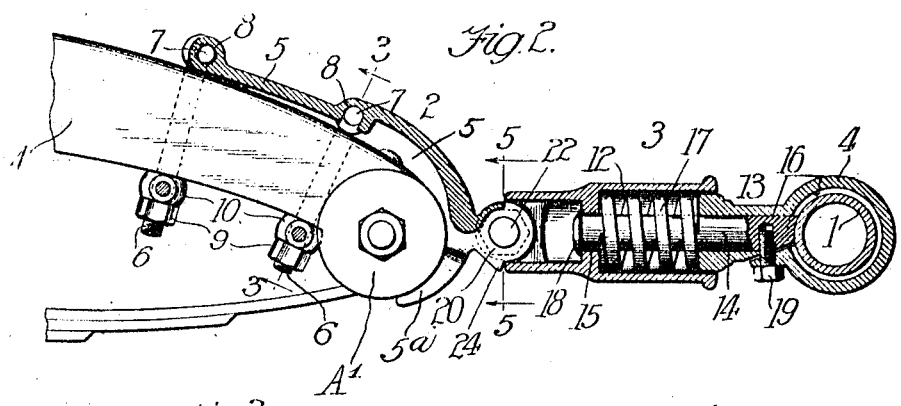
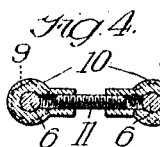
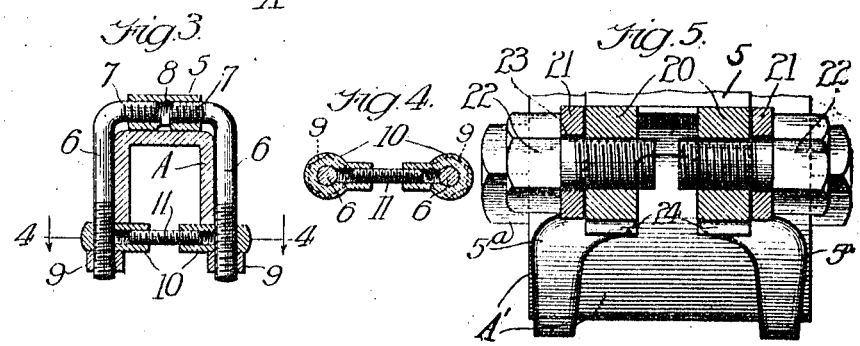
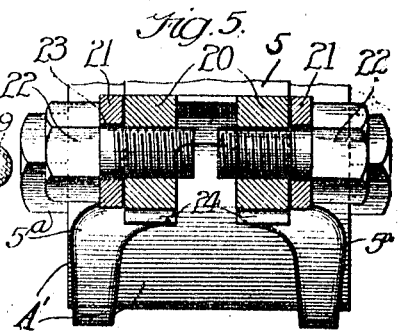
Witnesses:
Robert N. Weir
Paul Parker
Inventor:
Joseph Hadka,
By Luther L. Miller
Atty.

J. HADKA.
AUTOMOBILE FENDER.
APPLICATION FILED DEC. 5, 1910.
1,026,981.
Patented May 21, 1912.
2 SHEETS—SHEET 2.
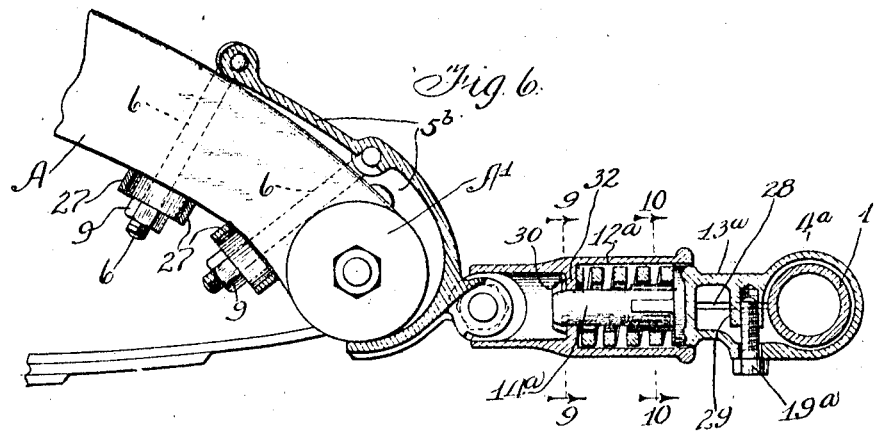
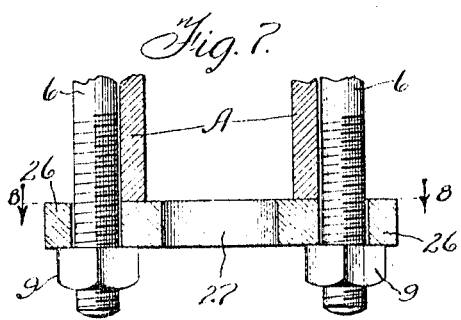
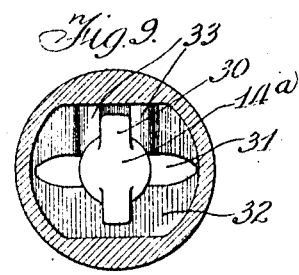
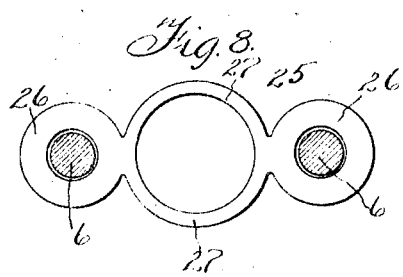
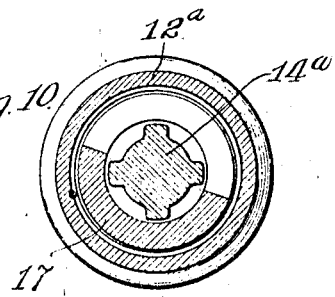
Witnesses:
J. C. Devick.
George L. Chindahl.
Inventor:
Joseph Hadka,
By Luther L. Miller
Atty.

UNITED STATES PATENT OFFICE.

JOSEPH HADKA, OF CHICAGO, ILLINOIS.

AUTOMOBILE-FENDER.

1,026,981.  Specification of Letters Patent.  Patented May 21, 1912.

Application filed December 5, 1910. Serial No. 595,547.

*To all whom it may concern:*

Be it known that I, JOSEPH HADKA, a citizen of the United States, residing at Chicago, in the county of Cook and State of Illinois, have invented certain new and useful Improvements in Automobile-Fenders, of which the following is a specification.

One of the objects of this invention is to produce an adjustable automobile fender which may be marketed as a complete article ready to be fitted to any style of car without altering the car in any way.

Another object is to produce a fender which may be easily secured to a car without the necessity of taking the car to a blacksmith or machine shop to have parts of the fender bent, forged or machined to fit the particular car.

A further object is to provide a fender which is adapted to be attached to frame members or springs of varying degrees of inclination and which is adjustable into proper position so that the impact bar will always yield horizontally. This object I accomplish by forming the impact-bar supporting devices in two sections adjustable with relation to each other, one of the sections being fixed to the car and the other section carrying the impact bar.

Other objects and advantages will be apparent as the invention is better understood from the following detailed description.

In the accompanying drawings Figure 1 is a top plan view of an automobile fender embodying the features of my invention, the view showing the device as applied to an automobile. Fig. 2 is an enlarged sectional view of one of the attaching members taken in the plane of line 2—2 of Fig. 1. Fig. 3 is a section on line 3—3 of Fig. 2. Fig. 4 is a section on line 4—4 of Fig. 3. Fig. 5 is an enlarged section taken in the plane of line 5—5 of Fig. 2. Fig. 6 is a sectional view of an alternative form of fender. Fig. 7 illustrates an alternative means for attaching the fender to the car. Fig. 8 is a section on line 8—8 of Fig. 7. Figs. 9 and 10 are sections on lines 9—9 and 10—10, respectively, of Fig. 6.

In the embodiment which I have herein shown by way of example in Figs. 1 and 2, the fender comprises an impact bar 1 extending transversely in front or rear of the vehicle, and two attaching devices carrying said impact bar at their forward ends and being adapted to be secured to the forward or rear portion of the automobile frame. These attaching devices are substantially identical. Each comprises a portion 2 adapted to be fixed to the downwardly bowed end of one of the side frame members A of the chassis, and a portion 3 carried at the forward end of the portion 2 and having a bearing 4 in which is mounted the impact bar 1.

In different styles of cars the frame member A is bowed downwardly at different angles from a horizontal plane. I have, therefore, provided an adjustable connection between the attaching portion 2 and the impact bar carrying portion 3, in order that the last-mentioned portion may be positioned so that the impact bar will yield in a horizontal plane regardless of the angle at which the attaching member 5 extends. This adjustable connection is a pivotal one and permits the portion 3 to be swung in a vertical plane into the proper position, as above described, after the part 2 has been secured to the car. The present form of said connection will be more specifically described hereinafter.

The attaching portion 2 comprises a member 5 which is so curved that it will fit upon the forward end of the frame member A of any standard make of automobile. The forward end of the member 5 comprises two lugs $5^a$ curving around under the boss $A^1$ far enough to assist in resisting any accidental upward stress placed upon the member 5. The frame members A of different makes of cars vary considerably in width (or horizontal dimension) and also in thickness (or vertical dimension). The means for securing the member 5 to the frame member A is therefore made adjustable so that it may conform to the various sizes of frame members A. Said means comprises pairs of bolts 6 adapted to lie at opposite sides of the frame member, said bolts in this instance having angular upper ends 7 which are threaded into bosses 8 on the member 5. The bolts 6 may be adjusted in the bosses 8 so that the bodies of such bolts fit closely alongside of the frame member A of the particular car to which the fender is to be attached. As shown in Fig. 3, the lower ends of the bolts 6 extend below the frame member A and have nuts 9 threaded thereon. Positioned between the nuts 9 and the under side of the frame member A is a means for engaging said under side of the frame member. This means consists in this instance of a pair of washer-like members 10 slidably fitting upon the bolts 6, said members being threaded upon opposite ends of a screw 11. As will be understood, when adjusting the bolts 6 in the bosses 8 so that said bolts are fitted closely alongside of the frame member A, the nuts 9 and washer members 10 are removed from said bolts. washers so that they may be slid upon the screw 11 to adjust the distance between said washers so that they may be solid upon the ends of the bolts 6. When so fitted the nuts 9 are replaced upon the bolts and turned up tightly to securely clamp the member 5 to the frame member A. The securing means just described is adjustable to conform to varying sizes of frame members.

The bosses $A^1$ are of differing sizes in different motor cars. Preferably the forward pair of bolts 6 is connected with the member 5 at such a point that when the fender is applied to cars having small bosses $A^1$ said bolts will extend substantially perpendicular to the member 5 and lie in contact with the periphery of the boss, thus preventing the fender from slipping forward along the frame member A. When the fender is applied to cars having larger bosses $A^1$ the forward pair of bolts 6 extends at an angle rearwardly and lies in contact with the periphery of the boss and prevents slipping of the fender.

It will be understood that, in practice, the dimensions and curvature of the member 2 may be proportioned to the shape and size of the rearwardly projecting ends of automobile frames, and to the elliptic or part-elliptic springs customarily used at the front and rear ends of electric automobiles, and that the present invention is not limited to use upon the front ends of motor cars nor to use upon frame ends.

The portion 3 which carries the impact bar 1 is preferably made of two telescoping sections 12 and 13. The section 13 carries at its forward end the bearing 4 for the impact bar 1, said section comprising a rod 14 which is slidably mounted at its rear end in an opening 15 in the section 12 and at its forward end is mounted in an opening 16 in the bearing portion 4. The rear end of said bearing portion fits slidably within the cylindrical section 12. Surrounding the rod 14 within the cylindrical section 12 is a coiled spring 17, said spring tending to force the section 13 forwardly. This forward movement of said section is limited by a head 18 formed upon the rear end of the rod 14 and engaging a portion of the section 12. In this instance the bearing 4 is split and the impact bar 1 is frictionally held in said bearing by means of a screw 19 which is threaded in the forward end of the rod 14, said screw compressing the bearing 4 upon the impact bar 1. The screw 19 also serves to secure the rod 14 and the bearing 4 together. It will be understood that the bearings 4 are adjustable along the impact bar 1 to space the attaching portions apart the same distance as the frame members A. The pivotal connection between the portions 2 and 3 comprises, in this instance, a pair of ears 20 at the forward end of the attaching member 5, said ears lying within a pair of ears 21 at the rear end of the section 12 of the portion 3. Screws 22 extending through openings 23 in the ears 21 and threaded in the ears 20 provide means for clamping the portion 3 and the member 5 together to secure the portion 3 in the desired horizontal position. Movement of the portion 3 to adjust its position will tighten one of the screws 22 and the other screw may then be tightened by means of a suitable wrench. Lugs 24 at the lower side of the ears 20 limit the downward movement of the portion 3.

In Figs. 6, 7 and 8 I have shown an alternative form of connection between the bolts 6 below the frame member A for holding the attaching member $5^b$ in place. This connection consists of a plate 25 having perforated ends 26 through which the bolts 6 extend, said plate being made extensible and contractible in a suitable way as by forming the middle of the plate of two side portions 27. The plate 25 is preferably made of brass or other relatively soft material, so that its length may be increased by hammering or pressing the side portions 27 together to the required extent, the length of the plate being decreased by pressure applied lengthwise of the plate to spread the side portions 27 apart more or less.

In the form of fender illustrated in Figs. 6, 9 and 10, the bearing $4^a$, the neck $13^a$ and the rod $14^a$ consist of an integral casting. The neck $13^a$ is slotted in opposite sides as at 28, and said neck is hollow or chambered, so that it may be compressed to clamp the impact bar 1 in the bearing $4^a$. The compressing means consists of a screw $19^a$ the head of which bears against the lower side of the neck $13^a$, and the threaded end of which screw takes into a threaded boss 29 on the upper part of the neck. The rod $14^a$ has a T-head 30 adapted to be inserted through a correspondingly shaped opening 31 in the wall 32 of the section $12^a$. The part $4^a$ $13^a$ $14^a$ is secured in the section $12^a$ by passing the T-head 30 through the opening 31 and giving the part a quarter-turn to carry the T-head out of register with the opening. A pair of low lugs 33 in the wall 32 is adapted to prevent casual relative rotation of the parts during handling; after the fender is on the car the impact bar prevents such rotation.

As will be seen, I have provided a neat and strong fender which is complete in itself, is adjustable to fit different styles of automobile and may be attached with the use of an ordinary wrench.

I do not limit myself to the exact details of construction herein shown, for modifications within the scope of the invention will occur to those skilled in the art.

I claim as my invention:

1. In an automobile fender, a member located upon the upper side of an automobile-part; a pair of bolts having angular ends threaded into opposite sides of said member, said bolts being arranged to lie at opposite sides of such automobile-part; an extensible and contractible device located at the under side of said automobile-part, the lower ends of said bolts extending through said extensible and contractible device; and nuts turned on the lower ends of said bolts to clamp said automobile-part between the first mentioned member and the extensible and contractible device.

2. In an automobile fender, a coiled spring, a chambered member containing said spring and having an inner end wall, an impact bar, and an integral casting comprising a bearing for the bar, a compressible neck portion, and a rod extending through said spring, one end of the spring bearing against a portion of said casting and the other end against a portion of said chambered member, the inner end of said rod having thereon a projection adapted to be passed through a non-circular opening in said inner wall and to lie at the inner side of said wall when the casting is given a partial rotation, said projection serving to limit the spring-caused movement of said casting.

3. In an automobile fender, in combination, an impact bar; and supporting devices at opposite ends of said bar, each of said devices comprising a member adapted to fit upon a part of an automobile; bolts carried by said member, and adapted to lie at opposite sides of said automobile part, said bolts being adjustable toward and away from each other; means carried at the ends of said bolts and adapted to engage said automobile part; and nuts threaded on the ends of said bolts and engaging said means to clamp the supporting device upon the automobile part.

4. In an automobile fender, in combination, members adapted to fit upon parts of an automobile; bolts adapted to lie at the sides of said parts, said bolts having angular ends threaded in said members, means carried by said bolts for engaging said parts; nuts threaded on said bolts and adapted to clamp said means against said parts for securing said members to said parts; an impact bar; and means at one end of each of said members for supporting said impact bar.

5. In an automobile fender, in combination, members adapted to fit upon parts of an automobile; pairs of bolts adapted to lie at the sides of said parts, said bolts having angular ends threaded in said members; pairs of washers fitting upon the ends of said bolts, the washers of each pair having a screw thread connection; nuts threaded upon said bolts, and adapted to clamp said washers against said parts; an impact bar; and means carried by said members for supporting said impact bar.

6. In an automobile fender, an attaching member located upon the upper side of the frame member A of an automobile, and securing means pivotally connected to said member and passing therefrom along both sides and beneath said frame member and bearing against the rear portion of the periphery of the boss $A^1$ of said frame member to prevent forward slippage of said attaching member.

7. In an automobile fender, an attaching member located upon a part of an automobile, securing means connected to said attaching member and located at opposite sides of said part, and an extensible and contractible member to connect said securing members at the side of said part opposite said attaching member.

8. In an automobile fender, an attaching member located upon a part of an automobile, securing members connected to said attaching member located at opposite sides of said part, and a plate adapted to connect said securing members at the side of said part opposite said attaching member, said plate having a portion adapted to be distorted so as to alter the length of said plate.

9. In an automobile fender, an attaching member located upon a part of an automobile, securing members connected to said attaching member located at opposite sides of said part, and a plate adapted to connect said securing members at the side of said part opposite said attaching member, said plate comprising two spaced portions adapted to be pressed together or spread apart to alter the length of said plate.

In testimony whereof I affix my signature in presence of two witnesses.

JOSEPH HADKA.

Witnesses:
C. PAUL PARKER,
GEORGE L. CHINDAHL.